United States Patent
Niu et al.

(10) Patent No.: US 11,341,366 B2
(45) Date of Patent: May 24, 2022

(54) CROSS-MODALITY PROCESSING METHOD AND APPARATUS, AND COMPUTER STORAGE MEDIUM

(71) Applicant: BEIJING BAIDU NETCOM SCIENCE AND TECHNOLOGY CO., LTD., Beijing (CN)

(72) Inventors: Guocheng Niu, Beijing (CN); Bolei He, Beijing (CN); Xinyan Xiao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/988,774

(22) Filed: Aug. 10, 2020

(65) Prior Publication Data
US 2021/0303921 A1 Sep. 30, 2021

(30) Foreign Application Priority Data
Mar. 30, 2020 (CN) .......................... 202010238730.0

(51) Int. Cl.
*G06K 9/62* (2022.01)
*G06T 7/73* (2017.01)
(Continued)

(52) U.S. Cl.
CPC .............. *G06K 9/6256* (2013.01); *G06T 7/73* (2017.01); *G06V 10/40* (2022.01); *G06V 30/274* (2022.01);
(Continued)

(58) Field of Classification Search
CPC ........ G06K 9/6256; G06K 9/46; G06K 9/726; G06K 2209/01; G06T 7/73; G06T 2207/20081; H04M 3/51; G09B 19/00
See application file for complete search history.

(56) References Cited

U.S. PATENT DOCUMENTS

2006/0088806 A1    4/2006 Quinn
2012/0288186 A1 * 11/2012 Kohli .................. G06K 9/6255
                                                        382/159
(Continued)

FOREIGN PATENT DOCUMENTS

CN          106095893 A       11/2016
CN          109255047 A        1/2019
(Continued)

OTHER PUBLICATIONS

Lu Hanbing, "Office Action for CN Application No. 202010238730.0", Sep. 18, 2020, CNIPA, China.
(Continued)

*Primary Examiner* — Oneal R Mistry
*Assistant Examiner* — Nicolas James Boyajian
(74) *Attorney, Agent, or Firm* — Novick, Kim & Lee, PLLC; Zhi Yang Xue; Jihun Kim

(57) ABSTRACT

A cross-modality processing method is related to a field of natural language processing technologies. The method includes: obtaining a sample set, wherein the sample set includes a plurality of corpus and a plurality of images; generating a plurality of training samples according to the sample set, in which each of the plurality of the training samples is a combination of at least one of the plurality of the corpus and at least one of the plurality of the images corresponding to the at least one of the plurality of the corpus; adopting the plurality of the training samples to train a semantic model, so that the semantic model learns semantic vectors containing combinations of the corpus and the images.

18 Claims, 7 Drawing Sheets

(51) Int. Cl.
    *G06V 10/40*     (2022.01)
    *G06V 30/262*    (2022.01)
    *G06V 30/10*     (2022.01)
(52) U.S. Cl.
    CPC .... *G06T 2207/20081* (2013.01); *G06V 30/10* (2022.01)

(56) References Cited

U.S. PATENT DOCUMENTS

| | | | | |
|---|---|---|---|---|
| 2017/0061250 | A1* | 3/2017 | Gao | G06N 3/0454 |
| 2017/0263019 | A1* | 9/2017 | Song | G06K 9/4671 |
| 2019/0251401 | A1* | 8/2019 | Shechtman | G06T 11/00 |
| 2019/0354802 | A1* | 11/2019 | Lin | G06K 9/4628 |
| 2020/0097604 | A1* | 3/2020 | Lee | G06K 9/4685 |
| 2021/0256068 | A1* | 8/2021 | Larlus | G06F 16/90332 |

FOREIGN PATENT DOCUMENTS

| | | |
|---|---|---|
| CN | 109378054 A | 2/2019 |
| CN | 109388723 A | 2/2019 |
| CN | 109447242 A | 3/2019 |
| CN | 109522970 A | 3/2019 |
| CN | 109816039 A | 5/2019 |
| CN | 110298395 A | 10/2019 |

OTHER PUBLICATIONS

Gen Li et al., "Unicoder-VL: A Universal Encoder for Vision and Language by Cross-modal Pre-training", Dec. 2, 2019.

Di Qi et al., "ImageBERT: Cross-modal Pre-training with Large-scale Weak-supervised Image-Text Data", pp. 1-12.

Weijie Su et al., "VL-BERT: Pre-training of Generic Visual-Linguistic Representations", Conference Paper at ICLR 2020, pp. 1-16.

Jiasen Lu et al., "ViLBERT:Pretraining Task-Agnostic Visiolinguistic Representations for Vision-and-Language Tasks", pp. 1-11.

Lothar Hermes, "Search Report for EP Application No. 21150239.8", Jul. 2, 2021, EPO, Germany.

* cited by examiner

CROSS-MODALITY PROCESSING METHOD AND APPARATUS, AND COMPUTER STORAGE MEDIUM

CROSS-REFERENCE TO RELATED APPLICATION

The present application is based upon and claims priority to Chinese Patent Application No. 202010238730.0, filed on Mar. 30, 2020, the entirety contents of which are incorporated herein by reference.

TECHNICAL FIELD

The present disclosure relates to a field of computer technologies, specifically to a field of Natural Language Processing (NLP) technologies, and more particularly, to a cross-modality processing method and a cross-modality processing apparatus, an electronic device and a computer storage medium.

BACKGROUND

The world is a multi-modal world full of different modal contents such as words and visions. With the rapid development of artificial intelligence technologies, the needs and requirements of multimodal processing, such as visual-language multimodal processing, are increasing.

However, the current multimodal processing method cannot capture enough semantic information during model training, and at the same time, a semantic relation between the text modal and the vision modal is not established, thus the model training effect is poor.

SUMMARY

The present disclosure provides a cross-modality processing method and a cross-modality processing apparatus, an electronic device and a computer storage medium.

Embodiments of the present disclosure provide a cross-modality processing method, the method includes:

obtaining a sample set, in which the sample set includes a plurality of corpus and a plurality of images;

generating a plurality of training samples according to the sample set, in which each of the plurality of the training samples is a combination of at least one of the plurality of the corpus and at least one of the plurality of the images corresponding to the at least one of the plurality of the corpus;

adopting the plurality of the training samples to train a semantic model, so that the semantic model learns semantic vectors containing combinations of the corpus and the images; and adopting the trained semantic model to perform a cross-modality process between the corpus and the images.

Embodiments of the second aspect of the present disclosure provide a cross-modality processing apparatus, the apparatus includes: one or more processors; a memory storing instructions executable by the one or more processors; in which the one or more processors are configured to: obtain a sample set, in which the sample set comprises a plurality of corpus and a plurality of images; generate a plurality of training samples according to the sample set, in which each of the plurality of the training samples is a combination of at least one of the plurality of the corpus and at least one of the plurality of the images corresponding to the at least one of the plurality of the corpus; adopt the plurality of the training samples to train a semantic model, so that the semantic model learns semantic vectors containing combinations of the corpus and the images; and adopt the trained semantic model to perform a cross-modality process between the corpus and the images.

Embodiments of the present disclosure provide a non-transitory computer-readable storage medium storing computer instructions, in which when the computer instructions are executed, the computer is caused to implement a cross-modality processing method. The method includes: obtaining a sample set, in which the sample set comprises a plurality of corpus and a plurality of images; generating a plurality of training samples according to the sample set, in which each of the plurality of the training samples is a combination of at least one of the plurality of the corpus and at least one of the plurality of the images corresponding to the at least one of the plurality of the corpus; adopting the plurality of the training samples to train a semantic model, so that the semantic model learns semantic vectors containing combinations of the corpus and the images; and adopting the trained semantic model to perform a cross-modality process between the corpus and the images.

It should be understood that the content described in this section is not intended to identify key or important features of the embodiments of the present disclosure, nor is it intended to limit the scope of the present disclosure. Additional features of the present disclosure will become easier to understand through the following description.

BRIEF DESCRIPTION OF THE DRAWINGS

The accompanying drawings are used to better understand the solution, and do not constitute a limitation on the application, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

A cross-modality processing method and a cross-modality processing apparatus, an electronic device and a computer storage medium according to embodiments of the present disclosure are described below with reference to the drawings.

Figure 1:
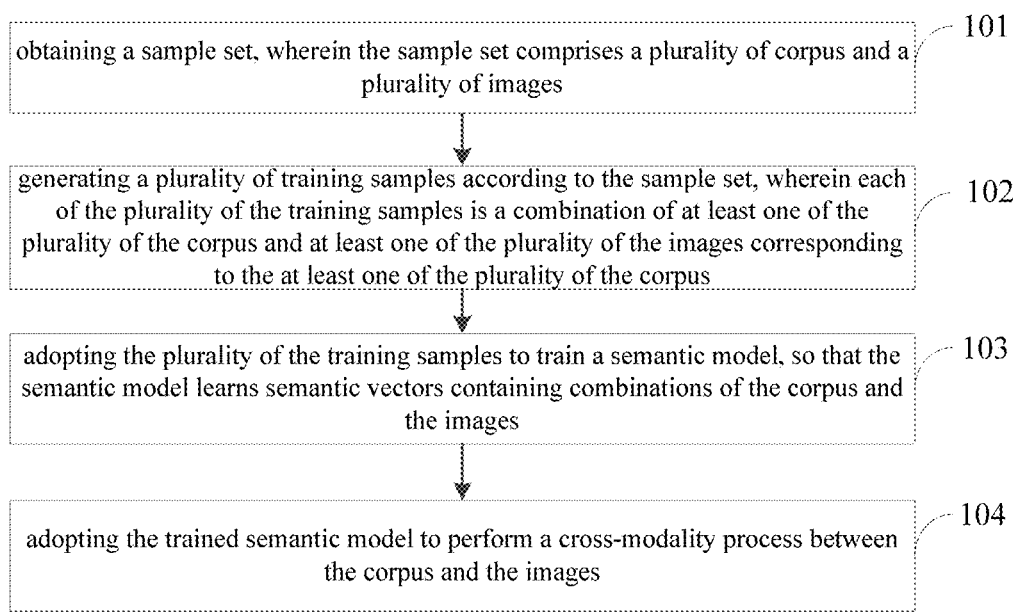
FIG. 1 is a flowchart of a cross-modality processing method according to an embodiment of the present disclosure.

FIG. 1 is a flowchart of a cross-modality processing method according to an embodiment of the present disclosure. Modal is a term used for interaction, and cross-modality refers to the phenomenon of comprehensive use of texts, images, videos and other means to interact with symbol carriers. Correspondingly, cross-modality is to include information of at least two modalities at the same time, for example, image and text information.

As illustrated in FIG. 1, the method includes the following steps.

At step 101, a sample set is obtained, in which the sample set includes a plurality of corpus and a plurality of images.

The corpus contains at least one text unit.

As a possible implementation, data of different modalities may be collected from the multimedia data set to generate the sample set, the sample set contains a plurality of images and a plurality of corresponding corpus for describing the content in the corresponding images.

At step 102, the plurality of training samples are generated according to the sample set, in which each of the plurality of the training samples is a combination of at least one of the plurality of the corpus and at least one of the plurality of the images corresponding to the at least one of the plurality of the corpus.

In detail, according to the plurality of the corpus and the plurality of the images included in the sample set, the plurality of the corpus and the plurality of the corresponding images are combined to generate the plurality of the training samples, and each of the plurality of the training samples is a combination of at least one of the plurality of the corpus and at least one of the plurality of the images corresponding to the at least one of the plurality of the corpus.

At step 103, the plurality of the training samples are adopted to train the semantic model, so that the semantic model learns semantic vectors containing combinations of the corpus and the images.

In this embodiment, the training sample is generated by combining the corpus and the image, so that the training sample contains both the text information and the corresponding image information, so that the semantic model is trained based on the combined information of corpus and image, thus the model may learn the semantic vectors containing combinations of the corpus and the images. The semantic vectors containing combinations of the corpus and the images contains the semantic relations between the two modalities, which improves the training effect of the semantic model. Compared with the related art, when performing semantic model training, a recognition model is established and trained separately based on the corpus and the images, and the results of the recognition model corresponding to each modality are weighted to obtain corresponding semantic information, so that the trained model may not recognize the semantic relations between the corpus and the images, that is, the semantic relations between the corpus and the corresponding image is split, thus the training effect of the model is poor and the recognition effect is poor.

It should be understood that the training samples in this embodiment may be a combination of at least one of the plurality of the corpus and any of the at least one of the plurality of the images. The corpus and the image are combined in different ways, thus the corresponding training tasks are different. The semantic model is trained for different training tasks, which is described in detail in subsequent embodiments.

At step 104, the trained semantic model is adopted to perform a cross-modality process between the corpus and the images.

In this embodiment, the trained semantic model learns the semantic vectors containing combinations of the corpus and the images, and learns the semantic relations between the corpus and the images. Furthermore, the trained semantic model is applied to cross-modality processing of specific corpus and images, for example, generating a corpus describing the corresponding image based on the image, or retrieve the corresponding image based on the corpus.

Optionally, in actual application scenarios, according to different recognition tasks, the images and corpus used for recognition may be identified, and the parameters of the model may be fine-tuned according to the recognition result of the model to improve the recognition effect of the model in the scene recognition task.

In the cross-modality processing method of this embodiment, the sample set is obtained, in which the sample set includes a plurality of corpus and a plurality of images, and the plurality of training samples are generated according to the sample set, in which each of the plurality of the training samples is a combination of at least one of the plurality of the corpus and at least one of the plurality of the images corresponding to the at least one of the plurality of the corpus. The plurality of the training samples are adopted to train the semantic model, so that the semantic model learns semantic vectors containing combinations of the corpus and the images. The trained semantic model is adopted to perform the cross-modality process between the corpus and the images. By training the combination of the training corpus and the corresponding image, the semantic model learns the semantic relation between the corpus and the corresponding image, thus the training effect of the semantic model for cross-modality processing is improved.

Based on the previous embodiment, this embodiment provides another cross-modality processing method. In this embodiment, a task executed by the semantic model is taken as the first training task for description.

Figure 2:
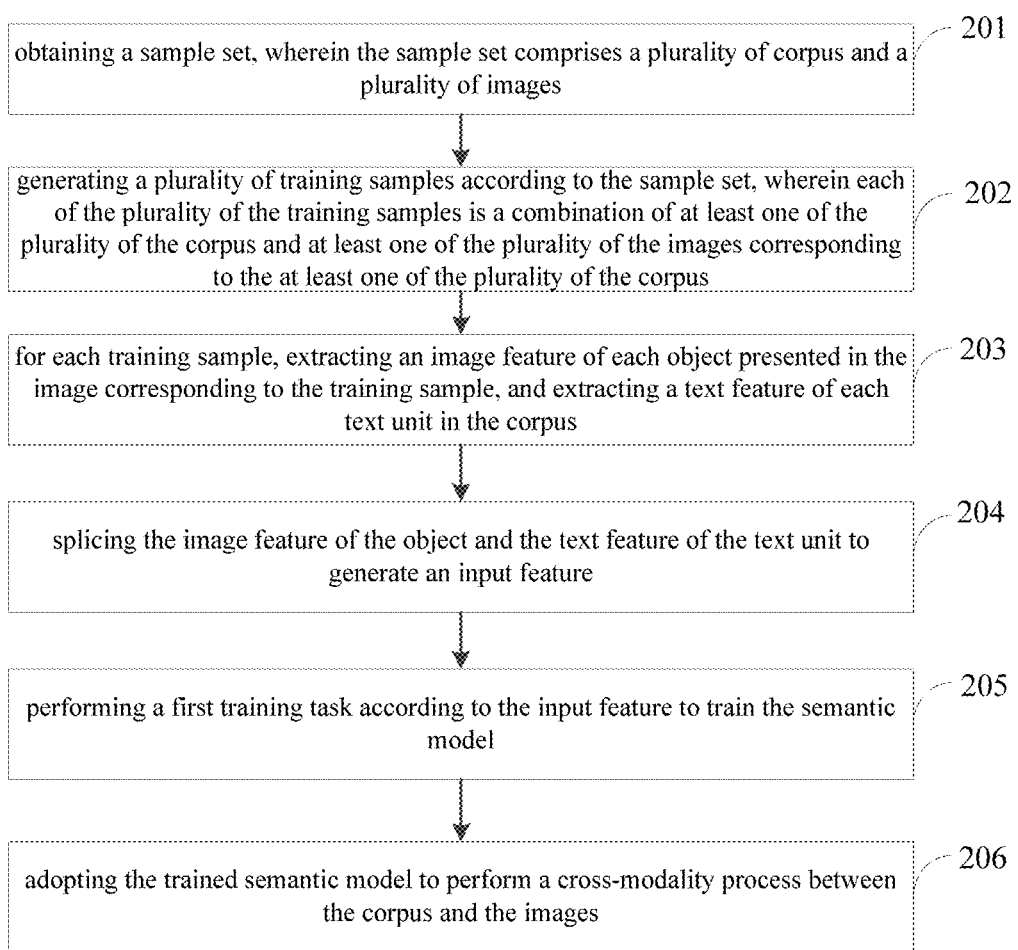
FIG. 2 is a schematic flowchart of another cross-modality processing method according to an embodiment of the present disclosure.

FIG. 2 is a schematic flowchart of another cross-modality processing method according to an embodiment of the present disclosure.

As illustrated in FIG. 2, the method may include the following steps.

At step 201, a sample set is obtained, in which the sample set includes a plurality of corpus and a plurality of images.

At step 202, a plurality of training samples are generated according to the sample set, in which each of the plurality of the training samples is a combination of at least one of the plurality of the corpus and at least one of the plurality of the images corresponding to the at least one of the plurality of the corpus.

In detail, reference may be made to steps 101-102 in the previous embodiment, and the principles are the same, which are not repeated here.

At step 203, for each training sample, an image feature of each object presented in the image corresponding to the training sample, and a text feature of each text unit in the corpus are extracted.

In this embodiment, for each training sample, the image feature of each object presented in the image corresponding to the training sample is extracted, in which object refers to an entity presented in the image, such as people, buildings, trees, and vehicles. In detail, for each object presented in the image, a visual feature and a spatial coordinate are obtained. As a possible implementation, in each training sample, for the image contained in the sample, the fast target detection model (Faster R-CNN model) is used to identify the area of each object in the image, and the feature corresponding to the area, namely the visual feature and the spatial coordinate. The visual feature is obtained by pooling the image content information of the corresponding region of interest through the Faster R-CNN model, and the spatial coordinate is used to indicate a display location of the corresponding object in the image. The visual feature and spatial coordinate are spliced to generate the object features of each object, and the image feature of each object is generated based on the object feature, an object sequence feature and a preset first modal identifier of each object. The object sequence feature is used to indicate mutual sequence relations between the objects, and the first modal identifier is used to indicate that the object belongs to the corresponding image.

Figure 3:
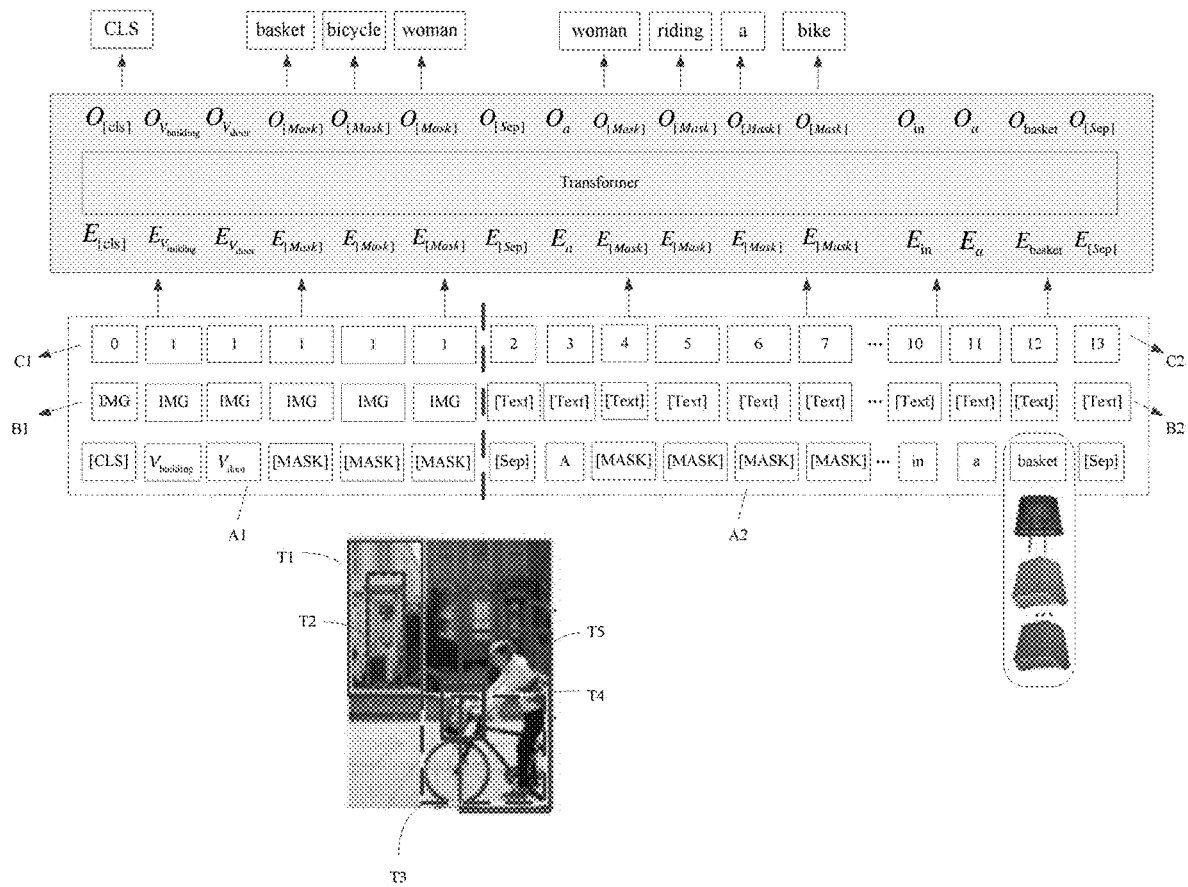
FIG. 3 is a schematic diagram of cross-modality processing according to an embodiment of the present disclosure.

As illustrated in FIG. 3, the image in the training sample is the image in FIG. 3. The image in FIG. 3 is identified through a semantic segmentation model, and the objects presented in the image include a building indicated by T1, a door indicated by T2, a bicycle indicated by T3, a basket indicated by T4, and a woman indicated by T5. The feature of each object is extracted to obtain the object feature of the object presented in the image, namely $V_{building}$, $V_{door}$, $V_{woman}$, $V_{bicycle}$, and $V_{basket}$. Since there is no sequence for each object in the image, the sequence feature of each object in the image may be a vector corresponding to a fixed ID, for example, 1. The first modal identifier is, for example, the setting identifier [IMG]. Among them, the sequence feature and the first modal identifier may also have other implementation methods, which are not limited in this embodiment. Furthermore, the object feature, the sequence feature corresponding to each object and the first modal identifier are spliced, that is, the image feature of each object is generated.

For each training sample, the text feature of each text unit in the corpus is extracted. In detail, a character feature and a location feature of each text unit in the corpus are obtained. The character feature is used to indicate the characters contained in the corresponding text unit, and the location feature is used to indicate the word sequence of the corresponding text unit. According to the character feature, location feature and a preset second modal identifier of each text unit, the text feature of each text unit is generated. The second modal identifier is used to indicate that the text unit belongs to the corresponding corpus.

For example, a corpus is: "A woman riding a bike with a dog in a basket", the corpus is divided into a plurality of text units, and each text unit contains a preset number of characters. The preset number may be one or more, in order to obtain the character feature of each text unit, that is, the preset number of characters contained in each text unit, all text units contained in the corpus are arranged in word order, the encoding starts at 2 and is increased by 1 in sequence. If the corpus has 12 text units, the corresponding location feature are encoded as 2, 3, 4, 5 . . . 12 and 13 in sequence. The preset second modal identifier is, for example, [Text], as shown in FIG. 3.

It should be noted that in this embodiment, for each training sample, the object feature of each object presented in the image is generated, and the text feature is generated correspondingly. After the object features are generated, if the dimension of the vector included in the object feature is greater than the dimension of the text feature, the object feature of each object is compressed to the same dimension as the corresponding text feature, so as to achieve the unity of the dimensions and facilitate data processing.

At step 204, the image feature of the object and the text feature of the text unit are spliced to generate an input feature.

In detail, the image feature of each object and the text feature of each text unit are spliced to obtain the input feature of the semantic model, so that the semantic model may train the combined features of the image and the corpus, thus the semantic model may obtain the semantic relation between the image and the corpus, and improve the recognition effect of the semantic model.

For example, as illustrated in FIG. 3, for each text unit in the corpus, the corresponding character feature in A2, the corresponding second modal identifier in B2 and the corresponding location feature in C2 are spliced to generate the corresponding text feature of the text unit. For each object in the image, the corresponding object feature in A1, the corresponding first modal identifier in B1 and the corresponding location feature in C1 are spliced to generate the image feature of the corresponding object. Furthermore, the image feature of each object and the text feature of each text unit are spliced together to obtain the input feature, and the input feature is represented by vectors.

At step 205, a first training task is executed according to the input feature to train the semantic model.

This embodiment includes a first training task and a second training task. In this embodiment, the semantic model is trained based on the first training task, and the model training process is based on the second training task, which is described in detail in sequential embodiments.

The first training task includes: for each training sample, selecting at least one text unit, replacing the text feature of the corresponding text unit in the input feature with a preset text mask, and/or selecting at least one object, and replacing the image feature of the object in the input feature with a preset image mask; inputting the input feature obtained after replacement into the semantic model to generate a first semantic vector output by the semantic model; predicting the selected text unit and/or the selected object according to the first semantic vector; and according to prediction accuracy, adjusting a parameter of the semantic model.

In detail, as a first possible implementation, the model is trained based on a mask of the text unit of the corpus. In detail, for each training sample, at least one text unit is selected, and the text feature of the corresponding text unit in the input feature is replaced with a preset text mask, the input feature after replacement is input into the semantic model to obtain the first semantic vector output by the semantic model. According to the first semantic vector, the selected text unit is predicted, and the parameter of the semantic model is adjusted according to the prediction accuracy.

As a second possible implementation, the model is trained based on the object mask in the image, specifically, at least one object is selected from the image of each training sample, since there may be a cross-overlap between the display areas of the objects in the image in space, or there may not be a cross-overlap area, therefore, two scenarios are described as follows.

In a scenario where the display area of an object in the image has a cross-overlap display area in space, there is a semantic relation between the two objects. Therefore, the selected object may include at least two objects with overlapping display areas to increase the granularity of the mask area and increase the semantic information contained in the mask area.

In another scenario, the display areas of the objects in the image do not overlaps with each other. Therefore, the selected object is an object whose display area does not overlap with display areas of remaining objects, thus when the objects in the image are independent objects, the selected object is determined, that is, the selected at least one object is an object whose display area does not overlap with display areas of remaining objects. By increasing the granularity of the mask area, the semantic information contained in the mask area is increased.

Furthermore, the image feature of the corresponding object in the input feature is replaced with the preset image mask. The input feature obtained after replacement is input into the semantic model to obtain the first semantic vector output by the semantic model, the selected object is predicted according to the first semantic vector, and the parameter of the semantic model are adjusted according to the prediction accuracy.

As a third possible implementation, the model is trained by masking the corpus and the image at the same time, specifically, at least one text unit is selected, and the text feature of the corresponding text unit in the input feature is replaced by the preset image mask. The input feature obtained after the replacement is input into the semantic model to obtain the first semantic vector output by the semantic model, the masked text portion and the text corresponding to the masked image portion are predicted according to the first semantic vector. According to the prediction accuracy, the parameter of the semantic model is adjusted by masking the at least one text unit and an image unit. Since the granularity of the mask is coarse, the semantic information contained in the mask portion is increased, so that the model can better learn the semantic relation between the corpus and the image, meanwhile improving the speed of parameter adjustment of the semantic model, and improving the training effect of the model.

For example, in FIG. 3, the model is trained by masking the corpus and the image at the same time. As illustrated in FIG. 3, four consecutive text units in the corpus are blocked, that is, the corresponding characters woman, riding, a and bike are replaced by the preset image mask [mask], and the mask of the 4 text units is completed. Meanwhile, for the three objects in the image, namely the object bicycle corresponding to T3, the object basket corresponding to T4, the woman corresponding to T5, the object features $V_{woman}$, $V_{bicycle}$ and $V_{basket}$ in the corresponding image feature are replaced by using the preset image mask [mask]. Therefore, the granularity of the mask in this embodiment is coarser. For the corpus, at least one text unit is masked, and for the image, at least one object in the image is masked, which may capture more semantic information. In the related art, the mask granularity is a single word or a single object, and the mask process does not perform well for large semantic units. For example, if the Chines character "尔" in a term "哈尔滨 (Harbin in English)" is replaced by a separate mask, it is easy to predict the word based on the Chines characters "哈" and "滨" (for example, based on "Ha[mask]bin"), and if the term "哈尔滨" is masked entirely, better semantics may be learned for "Harbin" if the term is predicted based on words before and after the term.

The input feature obtained after replacement is input into the semantic model to obtain the first semantic vector output by the semantic model, and predict the selected text unit and the selected object according to the first semantic vector. As illustrated in FIG. 3, the characters corresponding to the masked text unit are woman, riding, a and bike, and the characters predicted based on the first semantic vector output by the semantic model are woman, riding, a and bike, and the prediction result is completely accurate. The objects corresponding to the masked object features in the image feature are the basket image, bicycle image and woman image. The semantic model predicts and outputs the corresponding description text basket, bicycle and woman, and the prediction result is also completely accurate. In actual applications, the accuracy of the model is low at the beginning of the training of the model, by continuously adjusting the parameter of the semantic model according to the accuracy of the prediction result until the model converges, that is, the loss function of the semantic model is minimum, the accuracy of recognition is maximum.

At step 206, the trained semantic model is adopted to perform a cross-modality process between the corpus and the images.

In this embodiment, the trained semantic model learns the semantic vector of combinations of the corpus and the images, and learns the semantic relation between the corpus and the images. Furthermore, the trained semantic model is applied to cross-modality processing of specific corpus and images, two application scenarios are provided in this embodiment.

In a scenario, the trained semantic model is used to retrieve the corresponding images based on the corpus. In detail, the image and the corpus that need to be matched are input into the model, and it is determined whether the two match according to the output of the model, that is, the feature corresponding to the known corpus and the initial feature of the unknown image is input into the semantic model. According to the data corresponding to the image portion in the semantic vector of the known combination of the corpus and the image output by the semantic model, the object presented in the unknown image is predicted, and the unknown image is retrieved from the plurality of unknown images according to the predicted object to determine the image corresponding to the known corpus.

In another scenario, a trained semantic model is used to generate a corpus describing the corresponding image based on the image. In detail, the features corresponding to the known image and the initial feature of the unknown corpus are input into the semantic model, according to the data of the corresponding corpus in the semantic vector of the combination of the known image and the unknown corpus output by the model, an unknown description corpus for describing the corresponding known image is determined.

It should be noted that for the unknown corpus, it is not sure which image the corpus is used to describe, that is, the image corresponding to the corpus is unknown.

Optionally, in actual application scenarios, according to different recognition tasks, the images and corpus used for recognition are identified, and the parameter of the model is fine-tuned according to the recognition result of the model to improve the recognition effect of the model in the scene recognition task.

In the cross-modality processing method according to this embodiment, the sample set is obtained, in which the sample set includes a plurality of corpus and a plurality of images, and the plurality of training samples are generated according to the sample set, in which each of the plurality of the training samples is a combination of at least one of the plurality of the corpus and at least one of the plurality of the images corresponding to the at least one of the plurality of the corpus. The plurality of the training samples are adopted to train the semantic model, so that the semantic model learns semantic vectors containing combinations of the corpus and the images. The trained semantic model is adopted to perform the cross-modality process between the corpus and the images. By training the combination of the training corpus and the corresponding image, the semantic model learns the semantic relation between the corpus and the corresponding image, thus the training effect of the semantic model for cross-modal processing is improved.

Based on the above embodiment, this embodiment provides another cross-modality processing method. In this embodiment, a seed library is pre-selected, and information alignment is performed on the images and the texts based on the seed library, and information fusion is performed to improve the amount of information contained in the image feature and the text feature, and improve the training effect of the model.

Figure 4:
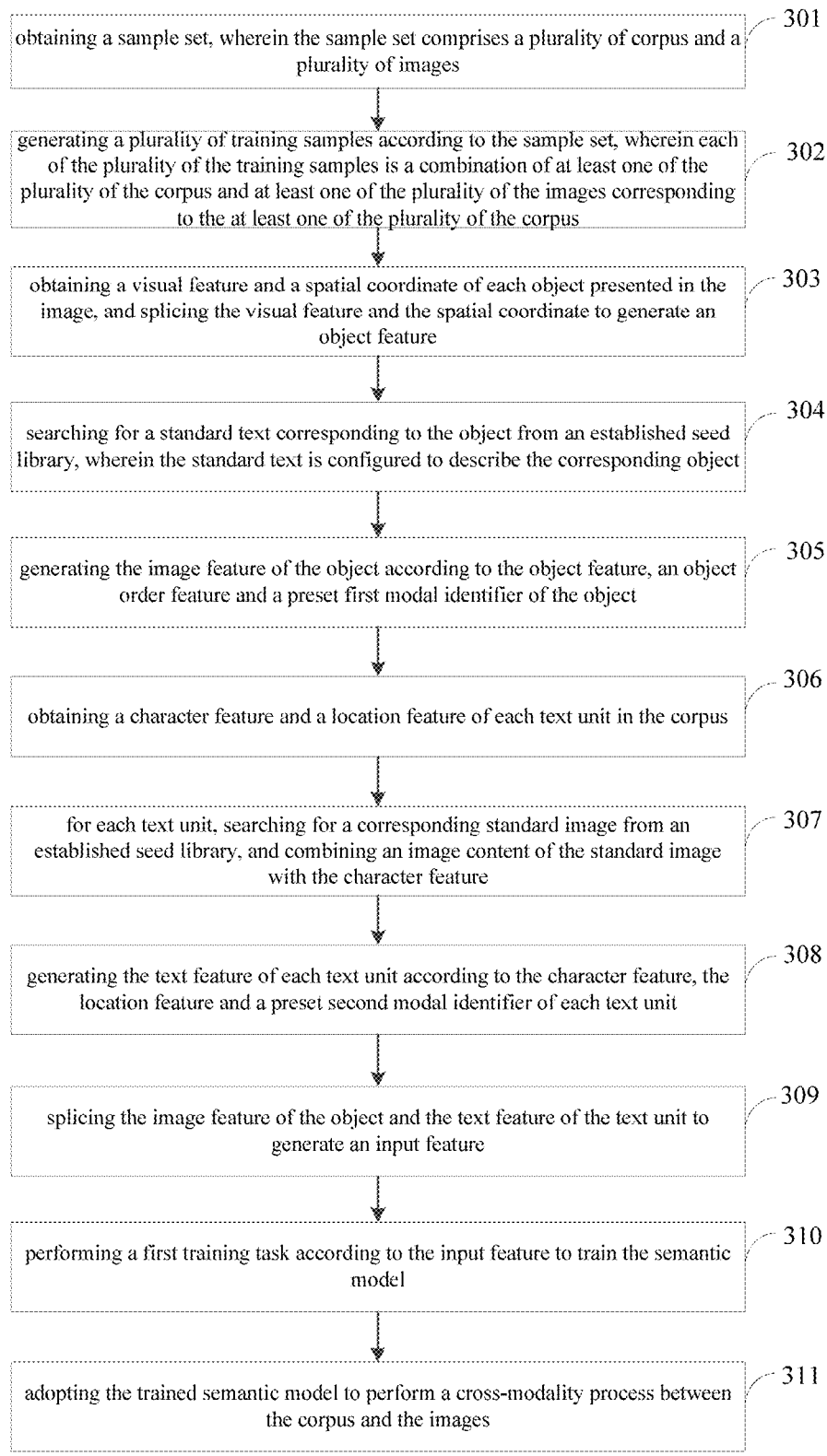
FIG. 4 is a flowchart of yet another cross-modality processing method according to an embodiment of the present disclosure.

FIG. 4 is a flowchart of yet another cross-modality processing method according to an embodiment of the present disclosure.

As illustrated in FIG. 4, the method includes the following steps.

At step 301, a sample set is obtained, in which the sample set includes a plurality of corpus and a plurality of images.

At step 302, a plurality of training samples are generated according to the sample set, in which each of the plurality of the training samples is a combination of at least one of the plurality of the corpus and at least one of the plurality of the images corresponding to the at least one of the plurality of the corpus.

At step 303, for each training sample, a visual feature and a spatial coordinate of each object presented in the image are obtained, the visual feature and the spatial coordinate are spliced to generate an object feature.

As a possible implementation, for each training sample, the fast target detection model Faster R-CNN is used to identify the area of each object in the image, and the feature corresponding to the area, namely the visual feature and the spatial coordinate. The visual feature is obtained by pooling the image content information of the corresponding region of interest through the Faster R-CNN model, and the spatial coordinate is used to indicate a display location of the corresponding object in the image. The visual feature and spatial coordinate are spliced to generate the object feature of the corresponding object.

It should be noted that in this embodiment, for each training sample, the object feature of each object presented in the image is generated, and the corresponding text feature is also generated. After the object feature is generated, if the dimensions of the vectors contained in the object features are greater than the dimension of the text feature, the object feature of each object is compressed to the same dimension as the corresponding text feature, so as to achieve the unity of dimensions and facilitate data processing. The method of generating text features will be described in detail in subsequent steps.

At step 304, for each object, a standard text corresponding to the object is searched from an established seed library, the character content of the standard text is combined with the object feature.

The standard text is used to describe the corresponding object.

Figure 5:
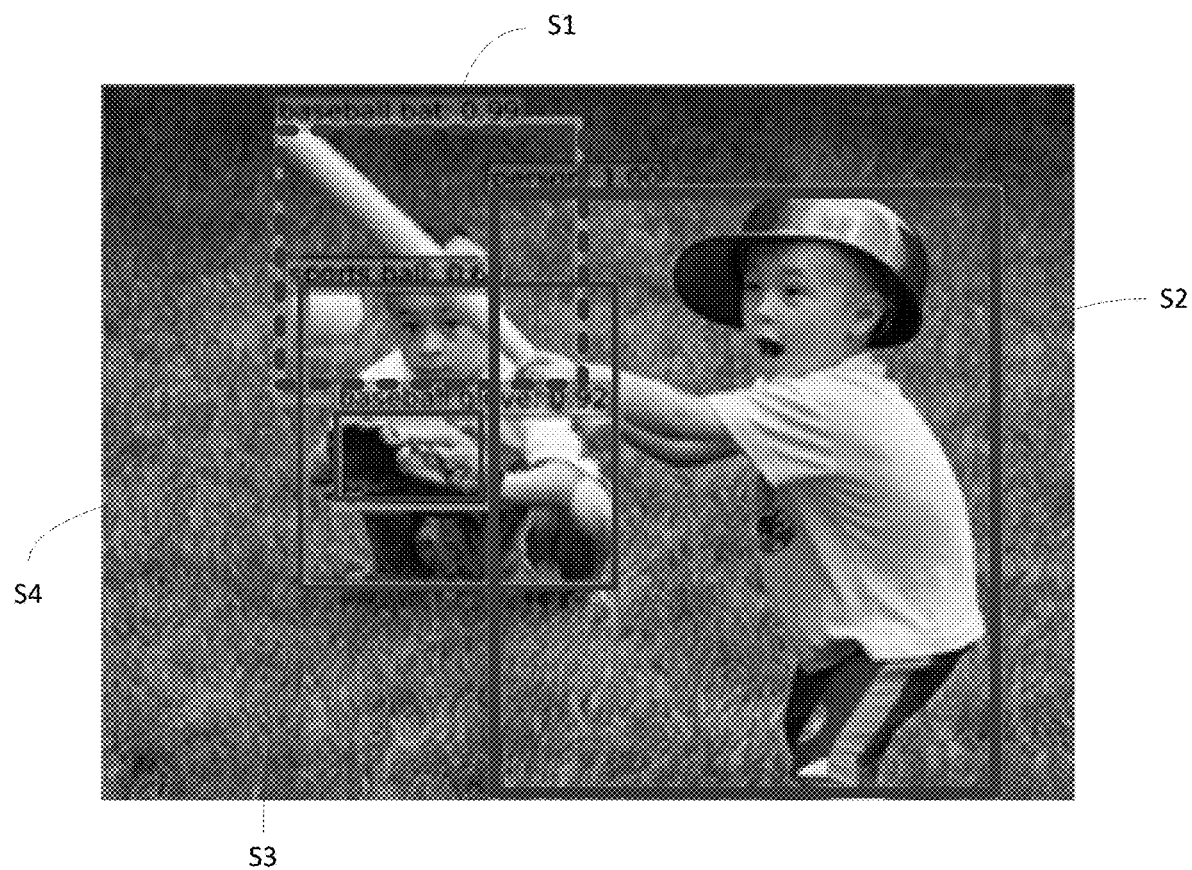
FIG. 5 is a schematic diagram of images and corresponding texts according to an embodiment of the present disclosure.

In this embodiment, the seed library is pre-established. As a possible implementation, a large number of image samples are obtained, and the fast target detection model Faster R-CNN is used to extract each frame subgraph boundingbox for each image, and a relation mapping library for each subgraph corresponding to each boundingbox and its corresponding text description. As illustrated in FIG. 5, the standard text baseball bat "baseballbat" and the frame subgraph boundingbox indicated by S1 have a corresponding relation, while the standard text "person" and the frame subgraph indicated by S2 have a corresponding relation, and the standard text sports ball "sport ball" and the frame subgraph boundingbox indicated by S3 have a corresponding relation, the standard text "baseball glove" the frame subgraph boundingbox indicated by S4 have a corresponding relation. Similarly, the correspondence between each frame subgraph and the corresponding standard text in each image are obtained. Since a standard text may correspond to a plurality of objects, for example, the basket has various shapes and creativity, but different basket images may correspond to the corresponding standard text "basket". Therefore, a one-to-more map of a certain scale may be established, and the standard text of each object may correspond to a plurality of different images, thereby constructing a seed library containing the mapping relation between the standard texts and the images.

For example, for each object, the corresponding standard text is searched from the established seed library. If the character content of the standard text is a 300-dimensional feature vector, and the object feature of the corresponding object is a 128-dimensional feature vector, then after the 300-dimensional feature vector corresponding to the annotated text is combined into the corresponding 128-dimensional object feature, a 128-dimensional object feature vector of the corresponding object is obtained, thereby realizing the fusion of the character content of the standard text into the corresponding object feature, in which the dimension of the object feature does not change, but the amount of information contained in the object feature increases, thereby improving the information contained in the image feature.

At step 305, the image feature of the object is generated according to the object feature, an object order feature and a preset first modal identifier of the object.

The object sequence feature is used to indicate mutual sequence relations between the objects, and the first modal identifier is used to indicate that the object belongs to the corresponding image. The first modal identifier may be a preset special identifier, such as [IMG].

As a possible implementation, according to the object feature of each object, the object sequence feature and the preset first modal identifier, the image feature of each object may be generated by splicing, thus the information contained in the image feature is added.

In detail, examples of the image feature may refer to step 203 in the embodiment corresponding to FIG. 2, the principle is the same, and details are not described here.

At step 306, a character feature and a location feature of each text unit in the corpus are obtained.

The character feature is used to indicate the characters contained in the corresponding text unit, and the location feature is used to indicate the word sequence of the corresponding text unit.

At step 307, for each text unit, a standard text corresponding to the object is searched from an established seed library, an image content of the standard image is combined with the character feature of the corresponding text unit.

The standard image presents the object described by the corresponding text unit, and the image content of the annotated image includes the sizes, colors, and shapes of the objects presented in the image.

For example, for each object, since the correspondence between each text unit and the corresponding annotated image has been pre-established in the seed library, the corresponding standard image is searched from the established seed library. For example, as shown in FIG. 3, the characters contained in the text unit are "basket". By searching in the seed library, a plurality of labeled images are determined. In FIG. 3, only three types of images are schematically shown. The image content is combined with the character features of the corresponding text unit. In detail, if the image content of the standard image corresponds to a 300-dimensional feature vector and the character feature of the corresponding text unit is a 128-dimensional feature vector, the 300-dimensional feature vector of the image content is combined with the 128-dimensional feature vector of the character feature, a 128-dimensional character feature vector is obtained, so that after the corresponding image content is combined with the character feature, the dimension of the character feature remains unchanged. However, the information contained in the character features increases, thereby improving the information contained in the text features and the semantic relation between the text and the objects. Furthermore, in the subsequent steps, the amount of semantic information contained in the input feature obtained by splicing the text features and the image features increases, which improves the training effect of the semantic model trained based on the input features.

At step 308, the text feature of each text unit is generated according to the character feature, the location feature and a preset second modal identifier of each text unit.

The character feature is used to indicate the characters contained in the corresponding text unit, and the location feature is used to indicate the word sequence of the corresponding text unit. The second modal identifier is used to indicate that the text unit belongs to the corresponding corpus, for example, the setting identifier [Text].

The text feature of each text unit is generated according to the character feature, the location feature and the preset second modal identifier of each text unit. Therefore, the information contained in the text feature is increased.

At step 309, the image feature of the object and the text feature of the text unit are spliced to generate an input feature.

In detail, the image feature of each object and the text feature of each text unit are spliced to obtain the input feature of the semantic model, so that the semantic model trains the combined feature of the image and the corpus, and the semantic model may obtain the semantic relation between the image and the corpus to improve the recognition effect of the semantic model.

For example, as illustrated in FIG. 3, for each text unit in the corpus, the corresponding character feature in A2, the corresponding second modal identifier in B2 and the corresponding location feature in C2 are spliced to generate the text feature of the corresponding text unit. For each object in the image, the corresponding object feature in A1, the corresponding first modal identifier in B1 and the corresponding location feature in C1 are spliced to generate the image feature of the corresponding object. Furthermore, the image feature of each object and the text feature of each text unit are spliced to obtain the input feature. The input feature is represented by vectors, which realizes the combination of text information and image information, so that the model may learn the relation between texts and images and improve the training effect of subsequent models.

At step 310, a first training task is executed according to the input feature to train the semantic model.

In detail, as a first possible implementation, the model is trained based on the mask of the text unit of the corpus. In detail, for each training sample, at least one text unit is selected, and the text feature of the corresponding text unit in the input feature is replaced with the preset text mask, and the input feature obtained after replacement is input into the semantic model to obtain the first semantic vector output by the semantic model. According to the first semantic vector, the selected text unit is predicted, and the parameter of the semantic model is adjusted according to the prediction accuracy.

As a second possible implementation, the model is trained based on the object mask in the image, specifically, at least one object is selected from the image of each training sample, since there may be a cross-overlap between the display areas of the objects in the image in space, or there may not be a cross-overlap area, therefore, two scenarios are described as follows.

In a scenario where the display area of an object in the image has a cross-overlap display area in space, there is a semantic relation between the two objects. Therefore, the selected object may include at least two objects with overlapping display areas to increase the granularity of the mask area and increase the semantic information contained in the mask area.

In another scenario, the display areas of the objects in the image do not overlaps with each other. Therefore, the selected object is an object whose display area does not overlap with display areas of remaining objects, thus when the objects in the image are independent objects, the selected object is determined, that is, the selected at least one object is an object whose display area does not overlap with display areas of remaining objects. By increasing the granularity of the mask area, the semantic information contained in the mask area is increased.

Furthermore, the image feature of the corresponding object in the input feature is replaced with the preset image mask. The input feature obtained after replacement is input into the semantic model to obtain the first semantic vector output by the semantic model, the selected object is predicted according to the first semantic vector, and the parameter of the semantic model are adjusted according to the prediction accuracy.

As a third possible implementation, the model is trained by masking the corpus and the image at the same time, specifically, at least one text unit is selected, and the text feature of the corresponding text unit in the input feature is replaced by the preset image mask. The input feature obtained after the replacement is input into the semantic model to obtain the first semantic vector output by the semantic model, the masked text unit and the selected object are predicted according to the first semantic vector. According to the prediction accuracy, the parameter of the semantic model is adjusted by masking the text unit and the image unit. By performing accuracy prediction by masking both text units and image units, the model can better learn the semantic relation between the corpus and the image, meanwhile improving the speed of parameter adjustment of the semantic model, and improving the training effect of the model.

For example, in FIG. 3, the model is trained by masking the corpus and the image at the same time. As illustrated in FIG. 3, four consecutive text units in the corpus are blocked, that is, the corresponding characters woman, riding, a and bike are replaced by the preset image mask [mask], and the mask of the 4 text units is completed. Meanwhile, the object features in the image features of the three objects in the image are replaced with the preset image mask [Mask]. Therefore, the granularity of the mask in this embodiment is coarser. For the corpus, at least one text unit is masked, and for the image, at least one object in the image is masked, which may capture more semantic information. In the related art, the mask granularity is a single word or a single object, and the mask process does not perform well for large semantic units. For example, if the Chines character "尔" in a term "哈尔滨 (Harbin in English)" is replaced by a separate mask, it is easy to predict the word based on the Chines characters "哈" and "滨" (for example, based on "Ha[mask] bin"), and if the term "哈尔滨" is masked entirely, better semantics may be learned for "Harbin" if the term is predicted based on words before and after the term.

The input feature obtained after replacement is input into the semantic model to obtain the first semantic vector output by the semantic model, and predict the selected text unit and the selected object according to the first semantic vector. As illustrated in FIG. 3, the characters corresponding to the masked text unit are woman, riding, a and bike, and the characters predicted based on the first semantic vector output by the semantic model are woman, riding, a and bike, and the prediction result is completely accurate. The objects corresponding to the masked object features in the image feature are the basket image, bicycle image and woman image. The semantic model predicts and outputs the corresponding description text basket, bicycle and woman, and the prediction result is also completely accurate. In actual applications, the accuracy of the model is low at the beginning of the training of the model, by continuously adjusting the parameter of the semantic model according to the accuracy of the prediction result until the model converges, that is, the loss function of the semantic model is minimum, the accuracy of recognition is maximum.

At step 311, the trained semantic model is adopted to perform a cross-modality process between the corpus and the images.

In detail, for the first training task based on the input features in steps 309 to 311, reference may be made to steps 204-206 in the embodiment corresponding to FIG. 2. The principles are the same, and details are not described here.

It should be understood that in this embodiment, through the preset seed library, the character content of the corresponding standard text is combined with the image feature of each object, so that the included information increases. Similarly, the text feature of each text unit is combined with the image content of the corresponding standard image, which increases the information contained, so that after splicing the text feature and the image feature after the amount of information is increased, the amount of semantic information contained in the obtained input feature is increasing, compared with the related art, when joint visual representation of the text and the image is performed, the correspondence between the features of the two modalities is not established. The features of the two modalities are separated, making the semantic model unable to learn the semantic relation between modalities in the cross-modality process, the training effect of the model is poor. In this application, through the construction of the seed library, the text and image feature are aligned and combined with each other, which makes the semantic model unable to learn the semantic relation between modalities in the cross-modality process and improves the training effect of the semantic model.

In the cross-modality processing method of this embodiment, the sample set is obtained, in which the sample set includes a plurality of corpus and a plurality of images, and the plurality of training samples are generated according to the sample set, in which each of the plurality of the training samples is a combination of at least one of the plurality of the corpus and at least one of the plurality of the images corresponding to the at least one of the plurality of the corpus. The plurality of the training samples are adopted to train the semantic model, so that the semantic model learns semantic vectors containing combinations of the corpus and the images. The trained semantic model is adopted to perform the cross-modality process between the corpus and the images. By training the combination of the training corpus and the corresponding image, the semantic model learns the semantic relation between the corpus and the corresponding image, thus the training effect of the semantic model for cross-modality processing is improved.

Based on the foregoing embodiments, this embodiment provides another cross-modality processing method. In this embodiment, the process of training the semantic model through a second training task is described.

Figure 6:
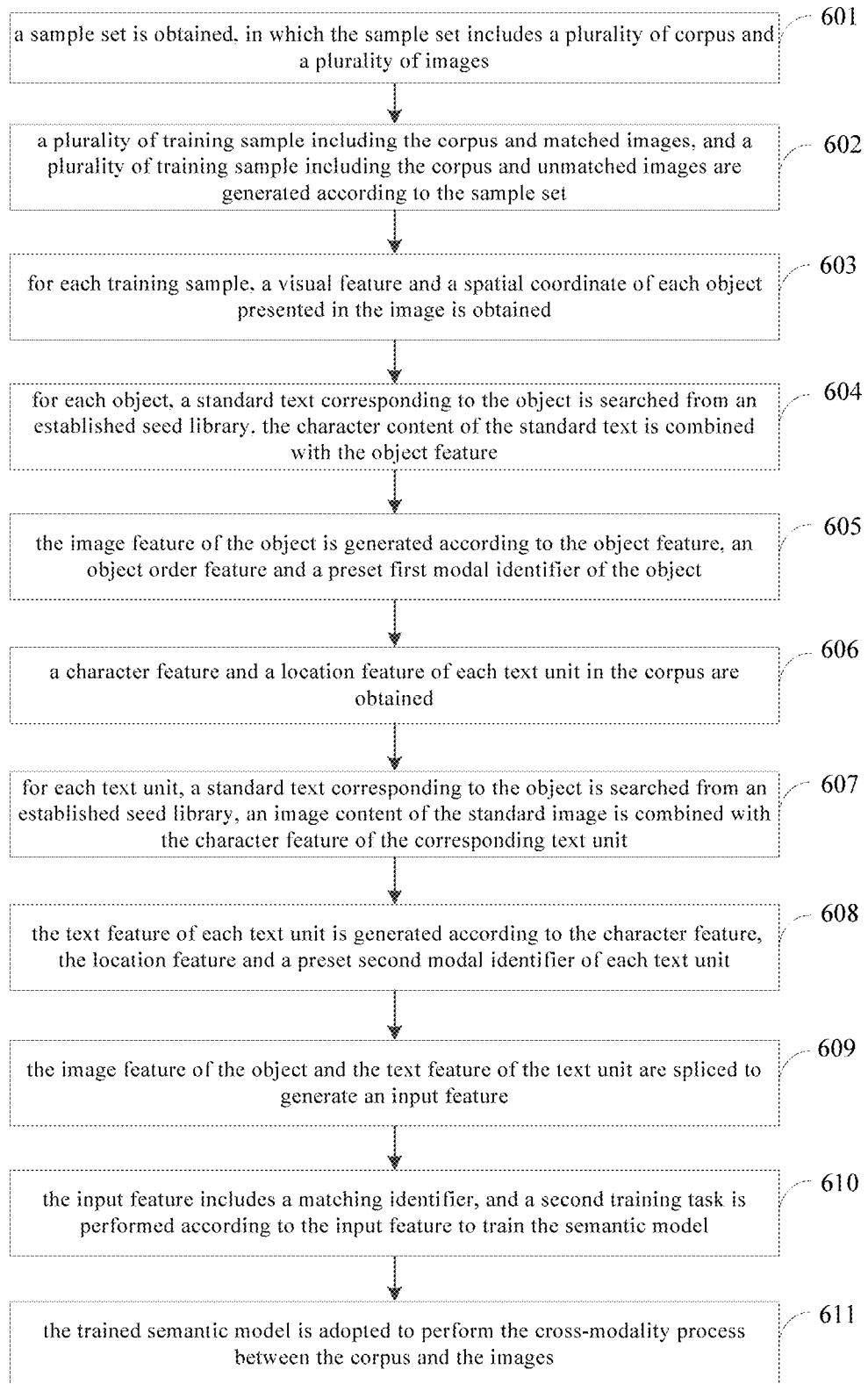
FIG. 6 is a flowchart of yet another cross-modality processing method according to an embodiment of the present disclosure.

FIG. 6 is a flowchart of yet another cross-modality processing method according to an embodiment of the present disclosure.

As illustrated in FIG. 6, the method includes the following steps.

At step 601, a sample set is obtained, in which the sample set includes a plurality of corpus and a plurality of images. The corpus includes at least one text unit.

As a possible implementation, data of different modalities may be collected from the multimedia data set to generate the sample set. The sample set includes the plurality of images and the plurality of corresponding corpus. The corpus is used to describe the content in the corresponding image.

At step 602, a plurality of training sample including the corpus and matched images, and a plurality of training sample including the corpus and unmatched images are generated according to the sample set.

In this embodiment, the second training task is used to train the model. The training samples used include positive example training samples and negative example training samples. A large number of positive example training samples and negative example training samples are used to improve model training effect and model training speed.

In detail, according to the sample set, each corpus is combined with the image described by the corresponding corpus to obtain a training sample including the corpus and matched images, that is, a positive example training sample.

In this embodiment, there are three possible generation methods for the training sample including the corpus and matched images, that is, a negative example training sample.

As a first possible implementation, a fixed corpus is combined with a randomly determined image to generate a training sample including the corpus and an unmatched image.

As a second possible implementation, a fixed image is combined with a randomly determined corpus to generate a training sample including the image and an unmatched corpus.

As a third possible implementation, a fixed corpus is combined with a randomly determined image to generate a training sample including the corpus and an unmatched image, and a fixed image is combined with a randomly determined corpus to generate a training sample including the image and an unmatched corpus.

At step 603, for each training sample, a visual feature and a spatial coordinate of each object presented in the image is obtained.

As a possible implementation, for each training sample, the fast target detection model Faster R-CNN is used to identify the area of each object in the image, and the feature corresponding to the area, namely the visual feature and the spatial coordinate. The visual feature is obtained by pooling the image content information of the corresponding region of interest through the Faster R-CNN model, and the spatial coordinate is used to indicate a display location of the corresponding object in the image.

At step 604, for each object, a standard text corresponding to the object is searched from an established seed library, the character content of the standard text is combined with the object feature.

Standard text is used to describe the corresponding object.

In this embodiment, the seed library is pre-established. As a possible implementation, a large number of image samples are obtained, and the fast target detection model Faster R-CNN is used to extract each frame subgraph boundingbox for each image, and a relation mapping library for each subgraph corresponding to each boundingbox and its corresponding text description. As illustrated in FIG. 5, the standard text baseball bat "baseballbat" and the frame subgraph boundingbox indicated by S1 have a corresponding relation, while the standard text "person" and the frame subgraph indicated by S2 have a corresponding relation, and the standard text "sport ball" and the frame subgraph boundingbox indicated by S3 have a corresponding relation, the standard text "baseball glove" the frame subgraph boundingbox indicated by S4 have a corresponding relation. Similarly, the correspondence between each frame subgraph and the corresponding standard text in each image are obtained. Since a standard text may correspond to a plurality of objects, for example, the basket has various shapes and creativity, but different basket images may correspond to the corresponding standard text "basket". Therefore, a one-to-more map of a certain scale may be established, and the standard text of each object may correspond to a plurality of different images, thereby constructing a seed library containing the mapping relation between the standard texts and the images.

For example, for each object, the corresponding standard text is searched from the established seed library. If the character content of the standard text is a 300-dimensional feature vector, and the object feature of the corresponding object is a 128-dimensional feature vector, then after the 300-dimensional feature vector corresponding to the annotated text is combined into the corresponding 128-dimensional object feature, a 128-dimensional object feature vector of the corresponding object is obtained, thereby realizing the fusion of the character content of the standard text into the corresponding object feature, in which the dimension of the object feature does not change, but the amount of information contained in the object feature increases, thereby improving the information contained in the image feature.

At step 605, the image feature of the object is generated according to the object feature, an object order feature and a preset first modal identifier of the object.

The object sequence feature is used to indicate mutual sequence relations between the objects, and the first modal identifier is used to indicate that the object belongs to the corresponding image. The first modal identifier may be a preset special identifier, such as [IMG].

As a possible implementation, according to the object feature of each object, the object sequence feature and the preset first modal identifier, the image feature of each object may be generated by splicing In detail, examples of the image feature may refer to step 203 in the embodiment corresponding to FIG. 2, the principle is the same, and details are not described here.

At step 606, a character feature and a location feature of each text unit in the corpus are obtained.

The character feature is used to indicate the characters contained in the corresponding text unit, and the location feature is used to indicate the word sequence of the corresponding text unit.

At step 607, for each text unit, a standard text corresponding to the object is searched from an established seed library, an image content of the standard image is combined with the character feature of the corresponding text unit.

The standard image presents the object described by the corresponding text unit, and the image content of the annotated image includes the sizes, colors, and shapes of the objects presented in the image.

For example, for each object, since the correspondence between each text unit and the corresponding annotated image has been pre-established in the seed library, the corresponding standard image is searched from the established seed library. For example, as shown in FIG. 3, the characters contained in the text unit are "basket". By searching in the seed library, a plurality of labeled images are determined. In FIG. 3, only three types of images are schematically shown. The image content is combined with the character features of the corresponding text unit. In detail, if the image content of the standard image corresponds to a 300-dimensional feature vector and the character feature of the corresponding text unit is a 128-dimensional feature vector, the 300-dimensional feature vector of the image content is combined with the 128-dimensional feature vector of the character feature, a 128-dimensional character feature vector is obtained, so that after the corresponding image content is combined with the character feature, the dimension of the character feature remains unchanged. However, the information contained in the character features increases, thereby improving the information contained in the text features and the semantic relation between the text and the objects. Furthermore, in the subsequent steps, the amount of semantic information contained in the input feature obtained by splicing the text features and the image features increases, which improves the training effect of the semantic model trained based on the input features.

At step 608, the text feature of each text unit is generated according to the character feature, the location feature and a preset second modal identifier of each text unit.

The character feature is used to indicate the characters contained in the corresponding text unit, and the location feature is used to indicate the word sequence of the corresponding text unit. The second modal identifier is used to indicate that the text unit belongs to the corresponding corpus, for example, the setting identifier [Text].

At step 609, the image feature of the object and the text feature of the text unit are spliced to generate an input feature.

In detail, the image feature of each object and the text feature of each text unit are spliced to obtain the input feature of the semantic model, so that the semantic model trains the combined feature of the image and the corpus, and the semantic model may obtain the semantic relation between the image and the corpus to improve the recognition effect of the semantic model.

For example, as illustrated in FIG. 3, for each text unit in the corpus, the corresponding character feature in A2, the corresponding second modal identifier in B2 and the corresponding location feature in C2 are spliced to generate the text feature of the corresponding text unit. For each object in the image, the corresponding object feature in A1, the corresponding first modal identifier in B1 and the corresponding location feature in C1 are spliced to generate the image feature of the corresponding object. Furthermore, the image feature of each object and the text feature of each text unit are spliced to obtain the input feature. The input feature is represented by vectors.

At step 610, the input feature includes a matching identifier, and a second training task is performed according to the input feature to train the semantic model.

The input features also include matching identifiers, which are preset learnable vectors, for example, learning classification (CLS) vectors.

The second training task includes: for each training sample, after setting the matching identifier in the corresponding input feature to a set value, inputting the matching identifier to the semantic model to generate a second semantic vector output by the semantic model; predicting a compatibility between the corpus and the image in the corresponding training sample according to a value of the matching identifier in the second semantic vector; and according to a difference between the predicted compatibility and an actual compatibility of the corresponding training sample, adjusting the parameter of the semantic model. By continuously adjusting the parameter of the semantic model and training through the second training task until the model converges, that is, the difference between the predicted matching result and the actual matching result is minimized, so as to realize the matching determination of the corpus and the corresponding image, which may be used in the field of corresponding retrieval of the image and the corpus.

It should be noted that the semantic model adjusts the value of the matching identifier according to the input features, and the value of the matching identifier after the adjusted value may be used to indicate the matching of the corpus and the image in the training sample.

At step 611, the trained semantic model is adopted to perform the cross-modality process between the corpus and the images.

In this embodiment, the trained semantic model learns the semantic vector of combinations of the corpus and the images, and learns the semantic relation between the corpus and the images. Furthermore, the trained semantic model is applied to cross-modality processing of specific corpus and images, two application scenarios are provided in this embodiment.

In a scenario, the trained semantic model is used to retrieve the corresponding image based on the corpus. In detail, it is required to determine whether the image and the corpus input into the model are matched based on the CLS value output by the model, that is, input the features corresponding to the known corpus and the initial features of the unknown image are input into the semantic model, and according to the data corresponding to the image portion in the semantic vector of the combination of the known corpus and unknown image output by the semantic model, the objects presented in the unknown image are predicted, and the unknown images are retrieved from the plurality of unknown images according to the predicted objects, thereby determining the image corresponding to the known corpus.

In another scenario, the trained semantic model is used to generate a corpus describing the corresponding image based on the image. In detail, the features corresponding to the known image and the initial features of the unknown corpus are input into the semantic model, according to the data corresponding to the image portion in the semantic vector of the combination of the known corpus and unknown image output by the semantic model, the unknown description corpus used to describe the corresponding known image is determined.

It should be noted that for the unknown corpus, it is not sure which image the corpus is used to describe, that is, the image corresponding to the corpus is unknown.

Optionally, in actual application scenarios, according to different recognition tasks, the images and corpus used for recognition are identified, and the parameter of the model is fine-tuned according to the recognition result of the model to improve the recognition effect of the model in the scene recognition task.

It should be noted that, in order to improve the training effect, the first training task and the second training task may both be executed, the two training tasks are performed iteratively, according to the matching degree of the prediction result of the first training task and the prediction result of the second training task, the loss value of the semantic model is calculated. The loss value of the model is obtained through the loss value of the loss function corresponding to the two training tasks. According to the calculated loss value of the model, the parameter of the semantic model is adjusted, so that the loss functions of both tasks are converged to improve the effectiveness of model training.

In the cross-modality processing method according to this embodiment, the sample set is obtained, in which the sample set includes a plurality of corpus and a plurality of images, and the plurality of training samples are generated according to the sample set, in which each of the plurality of the training samples is a combination of at least one of the plurality of the corpus and at least one of the plurality of the images corresponding to the at least one of the plurality of the corpus. The plurality of the training samples are adopted to train the semantic model, so that the semantic model learns semantic vectors containing combinations of the corpus and the images. The trained semantic model is adopted to perform the cross-modality process between the corpus and the images. By training the combination of the training corpus and the corresponding image, the semantic model learns the semantic relation between the corpus and the corresponding image, thus the training effect of the semantic model for cross-modal processing is improved.

In order to implement the above embodiments, the present disclosure also provides a cross-modality processing apparatus.

Figure 7:
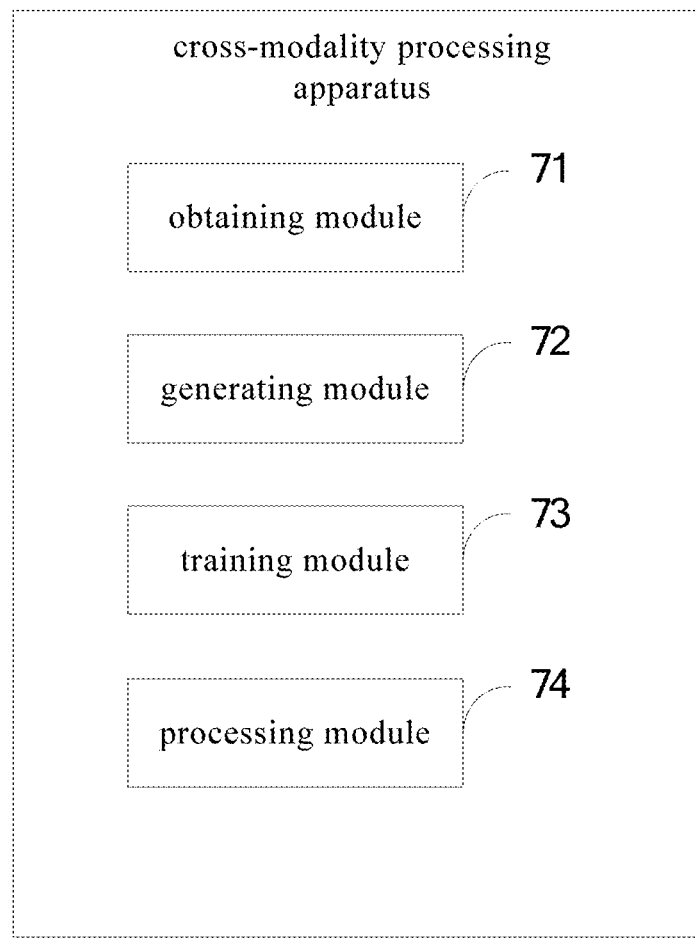
FIG. 7 is a schematic diagram of a cross-modality processing apparatus according to an embodiment of the present disclosure.

FIG. 7 is a schematic diagram of a cross-modality processing apparatus according to an embodiment of the present disclosure.

As illustrated in FIG. 7, the apparatus includes: an obtaining module 71, a generating module 72, a training module 73, and a processing module 74.

The obtaining module 71 is configured to obtain a sample set, wherein the sample set includes a plurality of corpus and a plurality of images.

The generating module 72 is configured to generate a plurality of training samples according to the sample set, in which each of the plurality of the training samples is a combination of at least one of the plurality of the corpus and at least one of the plurality of the images corresponding to the at least one of the plurality of the corpus.

The training module 73 is configured to adopt the plurality of the training samples to train a semantic model, so that the semantic model learns semantic vectors containing combinations of the corpus and the images.

The processing module 74 is configured to adopt the trained semantic model to perform a cross-modality process between the corpus and the images.

Further, in a possible implementation of the embodiment of the present disclosure, the training module 73 includes:

an extracting unit, configured to, for each training sample, extract an image feature of each object presented in the image corresponding to the training sample, and extract a text feature of each text unit in the corpus;

an splicing unit, configured to splice the image feature of the object and the text feature of the text unit to generate an input feature; and a training unit, configured to perform a first training task according to the input feature to train the semantic model.

The first training task includes:

for each training sample, selecting at least one text unit, replacing the text feature of the corresponding text unit in the input feature with a preset text mask, and/or selecting at least one object, and replacing the image feature of the object in the input feature with a preset image mask;

inputting the input feature obtained after replacement into the semantic model to generate a first semantic vector output by the semantic model;

predicting the selected text unit and/or the selected object according to the first semantic vector; and according to prediction accuracy, adjusting a parameter of the semantic model.

As a possible implementation, the selected object includes at least two objects whose display areas are overlapped; or, the selected object is an object whose display area does not overlap with display areas of remaining objects.

As a possible implementation, the generating module 72 is configured to:

combine each corpus with an image matched to description of the corpus to generate a training sample including the corpus and the matched image; and combine a fixed corpus with a randomly determined image to generate a training sample including the corpus and an unmatched image, and/or combine a fixed image with a randomly determined corpus to generate a training sample containing the image and an unmatched corpus.

As another possible implementation, the input feature includes a matching identifier, and the training module 73 is configured to:

perform a second training task according to the input feature to train the semantic model.

The second training task includes:

for each training sample, after setting the matching identifier in the corresponding input feature to a set value, inputting the matching identifier to the semantic model to generate a second semantic vector output by the semantic model;

predicting a compatibility between the corpus and the image in the corresponding training sample according to a value of the matching identifier in the second semantic vector; and according to a difference between the predicted compatibility and an actual compatibility of the corresponding training sample, adjusting the parameter of the semantic model.

As a possible implementation, the extracting unit includes:

an obtaining subunit, configured to obtain a visual feature and a spatial coordinate of each object presented in the image, wherein the visual feature is obtained by pooling image content information of a corresponding interesting area, and the spatial coordinate is used to indicate a location of the corresponding object in the image;

a splicing subunit, configured to splice the visual feature and the spatial coordinate to generate an object feature; and a generating subunit, configured to generate the image feature of the object according to the object feature, an object order feature and a preset first modal identifier of the object, wherein the object order feature is configured to indicate a mutual order relation between two objects, and the first modal identifier is used to indicate that the corresponding object is an image.

As another possible implementation, the extracting unit includes:

a searching subunit, configured to search for a standard text corresponding to the object from an established seed library, wherein the standard text is configured to describe the corresponding object; and a combining subunit, configured to combine a character content of the standard text with the object feature.

As another possible implementation, the obtaining subunit is further configured to obtain a character feature and a location feature of each text unit in the corpus, in which the character feature is used to indicate characters contained in the corresponding text unit, and the location feature is used to indicate a word order of the corresponding text unit.

The generating subunit is further configured to generate the text feature of each text unit according to the character feature, the location feature and a preset second modal identifier of each text unit.

As another possible implementation, the searching subunit is further configured to, for each text unit, search for a corresponding standard image from an established seed library, in which the corresponding object described by the text unit is presented in the standard image.

The combining subunit is further configured to combine an image content of the standard image with the character feature.

As another possible implementation, the processing module 74 is further configured to: adopt the trained semantic model to retrieve the image corresponding to the corpus; or adopt the trained semantic model to generate a corpus describing the corresponding image based on the image.

It should be noted that the foregoing explanation and description of the embodiment of the cross-modality processing method is also applicable for the cross-modality processing apparatus according to this embodiment, and details are not described here.

In the cross-modality processing method of this embodiment, the sample set is obtained, in which the sample set includes a plurality of corpus and a plurality of images, and the plurality of training samples are generated according to the sample set, in which each of the plurality of the training samples is a combination of at least one of the plurality of the corpus and at least one of the plurality of the images corresponding to the at least one of the plurality of the corpus. The plurality of the training samples are adopted to train the semantic model, so that the semantic model learns semantic vectors containing combinations of the corpus and the images. The trained semantic model is adopted to perform the cross-modality process between the corpus and the images. By training the combination of the training corpus and the corresponding image, the semantic model learns the semantic relation between the corpus and the corresponding image, thus the training effect of the semantic model for cross-modality processing is improved.

In order to implement the above embodiments, the present disclosure further provide an electronic device, the electronic device includes:

at least one processor; and a memory communicatively connected to the at least one processor; in which, the memory stores instructions executable by the at least one processor, when the instructions are executed by the at least one processor, the at least one processor are caused to implement the cross-modality processing method according to the above embodiments.

In a fourth aspect, the present disclosure provides a non-transitory computer-readable storage medium storing computer instructions, wherein when the computer instructions are executed, the computer is caused to implement the cross-modality processing method according to the above embodiments.

According to the embodiments of the present disclosure, the present disclosure also provides an electronic device and a readable storage medium.

Figure 8:
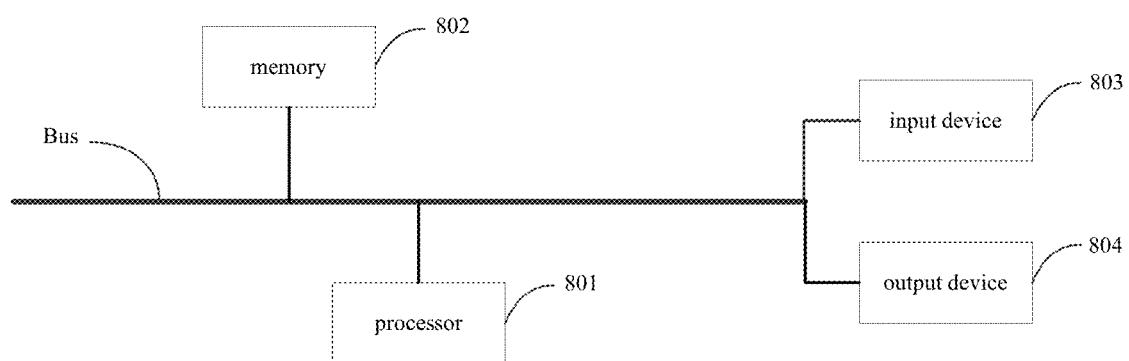
FIG. 8 is a block diagram of an electronic device for implementing a cross-modality processing method according to an embodiment of the present disclosure.

FIG. 8 is a block diagram of an electronic device for implementing a cross-modality processing method according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 8, the electronic device includes: one or more processors 801, a memory 802, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 801 is taken as an example in FIG. 8.

The memory 802 is a non-transitory computer-readable storage medium according to the present disclosure. The memory stores instructions executable by at least one processor, so that the at least one processor executes the cross-modality processing method according to the present disclosure. The non-transitory computer-readable storage medium of the present disclosure stores computer instructions, which are used to cause a computer to execute the cross-modality processing method according to the present disclosure.

As a non-transitory computer-readable storage medium, the memory 802 is configured to store non-transitory software programs, non-transitory computer executable programs and modules, such as program instructions/modules corresponding to the voice skill creation method in the embodiment of the present disclosure (For example, the obtaining module 71, the generating module 72, the training module 73, and the processing module 74 shown in FIG. 7). The processor 801 executes various functional applications and data processing of the server by running non-transitory software programs, instructions, and modules stored in the memory 802, that is, implementing the cross-modality processing method in the foregoing method embodiment.

The memory 802 may include a storage program area and a storage data area, where the storage program area may store an operating system and application programs required for at least one function. The storage data area may store data created according to the use of the electronic device, and the like. In addition, the memory 802 may include a high-speed random access memory, and a non-transitory memory, such as at least one magnetic disk storage device, a flash memory device, or other non-transitory solid-state storage device. In some embodiments, the memory 802 may optionally include a memory remotely disposed with respect to the processor 801, and these remote memories may be connected to the electronic device through a network. Examples of the above network include, but are not limited to, the Internet, an intranet, a local area network, a mobile communication network, and combinations thereof.

The electronic device for implementing the cross-modality processing method may further include: an input device 803 and an output device 804. The processor 801, the memory 802, the input device 803, and the output device 804 may be connected through a bus or in other manners. In FIG. 8, the connection through the bus is taken as an example.

The input device 803 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 804 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

In the cross-modality processing method of this embodiment, the sample set is obtained, in which the sample set includes a plurality of corpus and a plurality of images, and the plurality of training samples are generated according to the sample set, in which each of the plurality of the training samples is a combination of at least one of the plurality of the corpus and at least one of the plurality of the images corresponding to the at least one of the plurality of the corpus. The plurality of the training samples are adopted to train the semantic model, so that the semantic model learns semantic vectors containing combinations of the corpus and the images. The trained semantic model is adopted to perform the cross-modality process between the corpus and the images. By training the combination of the training corpus and the corresponding image, the semantic model learns the semantic relation between the corpus and the corresponding image, thus the training effect of the semantic model for cross-modality processing is improved.

It should be understood that various forms of processes shown above may be used to reorder, add, or delete steps. For example, the steps described in the present disclosure may be performed in parallel, sequentially, or in different orders. As long as the desired results of the technical solutions disclosed in the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A cross-modality processing method, comprising:
   obtaining a sample set, wherein the sample set comprises a plurality of corpora and a plurality of images;
   generating a plurality of training samples according to the sample set, wherein each of the plurality of the training samples is a combination of at least one of the plurality of the corpora and at least one of the plurality of the images corresponding to the at least one of the plurality of the corpora;
   training a semantic model with the plurality of the training samples, so that the semantic model learns semantic vectors containing combinations of the plurality of the corpora and the plurality of the images, the training comprises:
   for each training sample,
      extracting an image feature of each object presented in an image corresponding to the training sample, extracting a text feature of each text unit in a corpus and splicing the image feature of the object and the text feature of the text unit to generate an input feature,
      selecting at least one text unit and replacing the text feature of the selected text unit in the input feature with a preset text mask, and/or selecting at least one object and replacing the image feature of the selected object in the input feature with a preset image mask, and inputting the replaced input feature into the semantic model to generate a first semantic vector output by the semantic model, and
   predicting the selected text unit and/or the selected object according to the first semantic vector, and adjusting a parameter of the semantic model according to prediction accuracy; and
   adopting the trained semantic model to perform a cross-modality process between the plurality of the corpora and the plurality of the images.

2. The cross-modality processing method according to claim 1, wherein the selected object comprises at least two objects whose display areas are overlapped; or the selected object is an object whose display area does not overlap with display areas of remaining objects.

3. The cross-modality processing method according to claim 1, wherein the generating the plurality of the training samples according to the sample set comprises:
   combining each corpus with an image matched to description of the corpus to generate a training sample comprising the corpus and the matched image; and
   at least one of: combining a fixed corpus with a randomly determined image to generate a training sample comprising the corpus and an unmatched image, and combining a fixed image with a randomly determined corpus to generate a training sample containing the image and an unmatched corpus.

4. The cross-modality processing method according to claim 3, wherein the input feature comprises a learning classification (CLS) vector, and training the semantic model with the plurality of the training samples, comprises:
  performing a second training task according to the input feature to train the semantic model; and wherein,
  the second training task comprises:
  for each training sample, after setting the CLS vector in the corresponding input feature to a set value, inputting the CLS vector to the semantic model to generate a second semantic vector output by the semantic model;
  predicting a compatibility between the corpus and the image in the corresponding training sample according to a value of the CLS vector in the second semantic vector; and
  according to a difference between the predicted compatibility and an actual compatibility of the corresponding training sample, adjusting the parameter of the semantic model.

5. The cross-modality processing method according to claim 1, wherein the extracting the image feature of each object presented in the image corresponding to the training sample, comprises:
  obtaining a visual feature and a spatial coordinate of each object presented in the image, wherein the visual feature is obtained by pooling image content information of a corresponding interesting area, and the spatial coordinate is used to indicate a location of the corresponding object in the image;
  splicing the visual feature and the spatial coordinate to generate an object feature; and
  generating the image feature of the object according to the object feature, an object order feature and a preset first modal identifier of the object, wherein the object order feature is configured to indicate a mutual order relation between two objects, and the first modal identifier is used to indicate that the corresponding object is an image.

6. The cross-modality processing method according to claim 5, further comprising:
  before generating the image feature of the object according to the object feature, the object order feature and the preset first modal identifier of the object, searching for a standard text corresponding to the object from an established seed library, wherein the standard text is configured to describe the corresponding object; and
  combining a character content of the standard text with the object feature by fusing the character content into the object feature, in which a dimension of the object feature does not change.

7. The cross-modality processing method according to claim 1, wherein the extracting the text feature of each text unit in the corpus comprises:
  obtaining a character feature and a location feature of each text unit in the corpus, wherein the character feature is used to indicate characters contained in the corresponding text unit, and the location feature is used to indicate a word order of the corresponding text unit; and
  generating the text feature of each text unit according to the character feature, the location feature and a preset second modal identifier of each text unit.

8. The cross-modality processing method according to claim 7, further comprising:
  before generating the text feature of each text unit according to the character feature, the location feature and the preset second modal identifier of each text unit, for each text unit, searching for a corresponding standard image from an established seed library, wherein the corresponding object described by the text unit is presented in the standard image; and
  combining an image content of the standard image with the character feature by fusing the image content into the character feature, in which a dimension of the character feature does not change.

9. The cross-modality processing method according to claim 1, wherein the adopting the trained semantic model to perform the cross-modality process between the plurality of the corpora and the plurality of the images, comprises at least one of:
  adopting the trained semantic model to retrieve the image corresponding to the corpus; and
  adopting the trained semantic model to generate a corpus describing the corresponding image based on the image.

10. A cross-modality processing apparatus, comprising:
  one or more processors;
  a memory storing instructions executable by the one or more processors;
  wherein the one or more processors are configured to:
  obtain a sample set, wherein the sample set comprises a plurality of corpora and a plurality of images;
  generate a plurality of training samples according to the sample set, wherein each of the plurality of the training samples is a combination of at least one of the plurality of the corpora and at least one of the plurality of the images corresponding to the at least one of the plurality of the corpora;
  train a semantic model with the plurality of the training samples, so that the semantic model learns semantic vectors containing combinations of the plurality of the corpora and the plurality of the images, the training comprises:
  for each training sample,
    extracting an image feature of each object presented in an image corresponding to the training sample, extracting a text feature of each text unit in a corpus and splicing the image feature of the object and the text feature of the text unit to generate an input feature,
    selecting at least one text unit and replacing the text feature of the selected text unit in the input feature with a preset text mask, and/or selecting at least one object and replacing the image feature of the selected object in the input feature with a preset image mask, and inputting the replaced input feature into the semantic model to generate a first semantic vector output by the semantic model, and
    predicting the selected text unit and/or the selected object according to the first semantic vector, and adjusting a parameter of the semantic model according to prediction accuracy; and
  adopt the trained semantic model to perform a cross-modality process between the plurality of the corpora and the plurality of the images.

11. The cross-modality processing apparatus according to claim 10, wherein the selected object comprises at least two objects whose display areas are overlapped; or the selected object is an object whose display area does not overlap with display areas of remaining objects.

12. The cross-modality processing apparatus according to claim 10, wherein the one or more processors are configured to:

combine each corpus with an image matched to description of the corpus to generate a training sample comprising the corpus and the matched image; and perform at least one of: combining a fixed corpus with a randomly determined image to generate a training sample comprising the corpus and an unmatched image, and combining a fixed image with a randomly determined corpus to generate a training sample containing the image and an unmatched corpus.

13. The cross-modality processing apparatus according to claim 12, wherein the input feature comprises a learning classification (CLS) vector, and the one or more processors are configured to:

perform a second training task according to the input feature to train the semantic model; and wherein, the second training task comprises:

for each training sample, after setting the CLS vector in the corresponding input feature to a set value, inputting the CLS vector to the semantic model to generate a second semantic vector output by the semantic model;

predicting a compatibility between the corpus and the image in the corresponding training sample according to a value of the CLS vector in the second semantic vector; and according to a difference between the predicted compatibility and an actual compatibility of the corresponding training sample, adjusting the parameter of the semantic model.

14. The cross-modality processing apparatus according to claim 10, wherein the one or more processors are configured to:

obtain a visual feature and a spatial coordinate of each object presented in the image, wherein the visual feature is obtained by pooling image content information of a corresponding interesting area, and the spatial coordinate is used to indicate a location of the corresponding object in the image;

splice the visual feature and the spatial coordinate to generate an object feature; and generate the image feature of the object according to the object feature, an object order feature and a preset first modal identifier of the object, wherein the object order feature is configured to indicate a mutual order relation between two objects, and the first modal identifier is used to indicate that the corresponding object is an image.

15. The cross-modality processing apparatus according to claim 14, wherein the one or more processors are configured to:

search for a standard text corresponding to the object from an established seed library, wherein the standard text is configured to describe the corresponding object; and combine a character content of the standard text with the object feature by fusing the character content into the object feature, in which a dimension of the object feature does not change.

16. The cross-modality processing apparatus according to claim 10, wherein, the one or more processors are configured to:

obtain a character feature and a location feature of each text unit in the corpus, wherein the character feature is used to indicate characters contained in the corresponding text unit, and the location feature is used to indicate a word order of the corresponding text unit; and generate the text feature of each text unit according to the character feature, the location feature and a preset second modal identifier of each text unit.

17. The cross-modality processing apparatus according to claim 16, wherein, the one or more processors are configured to:

for each text unit, search for a corresponding standard image from an established seed library, wherein the corresponding object described by the text unit is presented in the standard image; and combine an image content of the standard image with the character feature by fusing the image content into the character feature, in which a dimension of the character feature does not change.

18. A non-transitory computer-readable storage medium storing computer instructions, wherein when the computer instructions are executed, a computer is caused to implement a cross-modality processing method, and the method comprises:

obtaining a sample set, wherein the sample set comprises a plurality of corpora and a plurality of images;

generating a plurality of training samples according to the sample set, wherein each of the plurality of the training samples is a combination of at least one of the plurality of the corpora and at least one of the plurality of the images corresponding to the at least one of the plurality of the corpora;

training a semantic model with the plurality of the training samples, so that the semantic model learns semantic vectors containing combinations of the plurality of the corpora and the plurality of the images, the training comprises:

for each training sample, extracting an image feature of each object presented in an image corresponding to the training sample, extracting a text feature of each text unit in a corpus and splicing the image feature of the object and the text feature of the text unit to generate an input feature, selecting at least one text unit and replacing the text feature of the selected text unit in the input feature with a preset text mask, and/or selecting at least one object and replacing the image feature of the selected object in the input feature with a preset image mask, and inputting the replaced input feature into the semantic model to generate a first semantic vector output by the semantic model, and predicting the selected text unit and/or the selected object according to the first semantic vector, and adjusting a parameter of the semantic model according to prediction accuracy; and adopting the trained semantic model to perform a cross-modality process between the plurality of the corpora and the plurality of the images.

* * * * *